M. DE M. ARRIOJA.
ANIMAL TRAP.
APPLICATION FILED JAN. 15, 1916.

1,213,997.

Patented Jan. 30, 1917.
2 SHEETS—SHEET 1.

INVENTOR

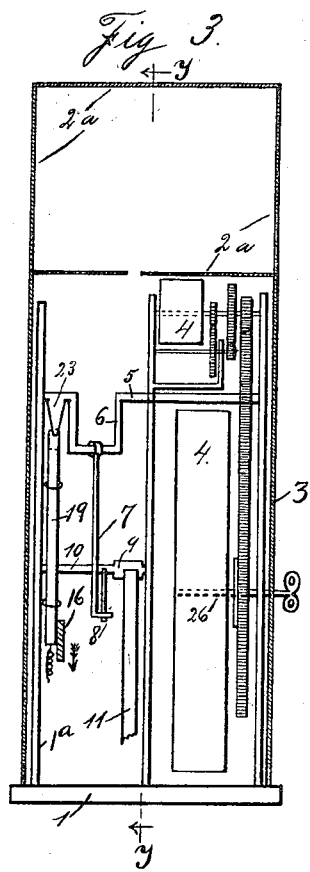

UNITED STATES PATENT OFFICE.

MIGUEL DE MARIA ARRIOJA, OF NEW YORK, N. Y.

ANIMAL-TRAP.

1,213,997.

Specification of Letters Patent.   Patented Jan. 30, 1917.

Application filed January 15, 1916.   Serial No. 72,192.

*To all whom it may concern:*

Be it known that I, MIGUEL DE MARIA ARRIOJA, a citizen of the Republic of Mexico, and resident of the city of New York, in the county of New York and State of New York, have invented a certain new and useful Animal-Trap, of which the following is a specification.

This invention relates to traps for catching or destroying animals, and its principal object is to provide an improved trap that may be utilized with convenience and will operate effectively.

Other objects and advantages will hereinafter appear.

Figure 2:
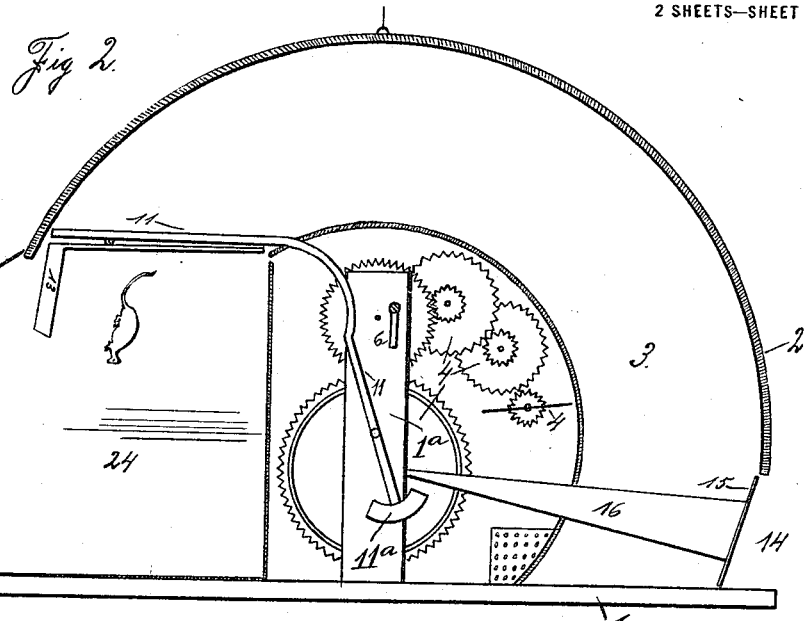
Figure 1:
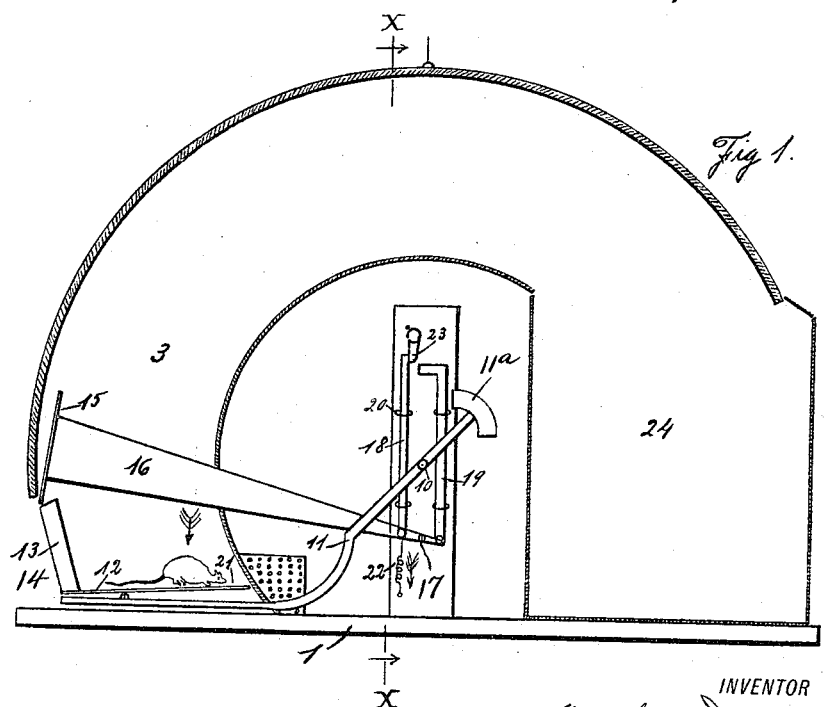

In the accompanying drawings,—Figures 1 and 2 are general longitudinal sectional elevations of the trap taken on the line $y$—$y$ of Fig. 3, showing its parts in set and operating positions respectively. Fig. 3 is a section of the trap, taken on line $x$—$x$ of Fig 1.

Upon a floor-board 1 is secured a casing 2 which incloses the entire operating mechanism and all the working parts of the trap. To the casing-wall 3 is fixed a key-wound clock-motor 4 the drive-shaft 5 of which carries a crank 6, and a link 7 connects said crank with an arm 8 secured to a sleeve 9 which is rotatably mounted upon a fixed shaft 10 and carries a bar 11, preferably provided with a counterweight 11$^a$. Said bar extends downwardly to the floor 1 and has thereupon fulcrumed a platform 12 which is provided at its side with an upward extension 13. The platform 12 is disposed adjacent to the end of board 1, whereat the casing 2 has an opening 14 above which is located a door 15 therefor that normally rests on top of the extension 13. A lever 16 secured to the door 15 is fulcrumed at 17 to a post 1$^a$ upon the floor 1, and at opposite sides of its fulcrum are pivoted bars 18, 19 that are mounted to slide vertically in guiding-ears 20.

The motor 4 tends to rotate the crank 6 in a clockwise direction, as viewed in Fig. 1, and abutment of said crank against the bar 18 normally prevents rotation thereof and operation of said motor. Bait is placed at 21 upon the platform 12 and animal following the scent thereof enters the trap through the opening 14. The animal causes said platform to tilt and swing its projection 13 inwardly, whereby the door 15 is released and permitted to drop, by its weight and the pull of a spring 22, and to close the opening 14. When said door drops the lever 16 swings about its pivot and causes the bar 18 to slide downwardly and the bar 19 upwardly. The downward movement of the bar 18 releases the crank 6 whereby the motor 4 is permitted to operate the crank to perform a complete revolution. At the termination of its revolution the crank 6 strikes a projection 23 of bar 19 and thereby causes this bar again to descend and the bar 18 to ascend, and simultaneously the crank again abuts against the bar 18 to arrest its revolution and operation of the motor. During the interval of operation of the motor 4 and revolution of the crank 6 the link 7 swings the bar 11 about its pivoted sleeve 9 and raising the platform 12 conveys it from the position shown in Fig. 1 to that shown in Fig. 2 and then back to initial position. The animal is thereby lifted and conveyed by the platform 12 between the side and top and bottom walls 2$^a$ of the casing 2 and brought over the water-tank 24 whereat it falls into said tank and is drowned therein. Upon return of the platform 12 to its initial position in Fig. 1 the door 15 which had previously dropped is again lifted to clear the opening 14 by means of the crank 6 striking the projection 23, depressing the rod 19, and swinging the lever 16. As the door 15 is thus lifted the extension 13 of platform 12 again swings thereunder and maintains it elevated and the entire trap with all of its working parts ready for the next operation, which operation is again similarly performed upon the next animal entering the opening 14.

Variations may be resorted to within the scope of the invention, and portions of the improvements may be used without others.

Having thus described my invention, I claim:—

1. An animal trap having the combination with a motor, and a receptacle, of a platform for the animal, means to set said motor in operation actuated by said platform upon the animal reaching thereto, means to maintain said motor in operation for an interval, and means to elevate said platform toward said tank from a lower position to a position above said tank and to return it to initial position by the operation of said motor.

2. An animal trap having the combination with a motor, and a receptacle, of a platform for the animal, a casing surrounding said platform, means to set said motor in operation upon the animal reaching said platform, said casing having an opening for the animal to reach said platform, means to move said platform in a motion of translation toward said tank from a lower position to a position above said tank and to return it to initial position by the operation of said motor, and means to close said opening during the operation of said platform.

3. An animal trap having the combination with a motor, and destruction means, of a platform for the animal, means to set said motor in operation upon the animal reaching said platform, and means to elevate said platform and move it in a motion of translation toward said destruction means from a lower position to a position above the destruction means and to return it to initial position by the operation of said motor.

4. An animal trap having the combination with a motor, and a receptacle, of a platform for the animal, a casing surrounding said platform having an opening for the animal to reach said platform, means to set said motor in operation actuated by said platform upon the animal reaching thereto, a door carried by said means for setting the motor in operation, means to move said platform toward said tank and to return it to initial position by the operation of said motor, and said means for setting the motor in operation causing said door to close at the commencement of operation of said platform and to open at the termination of operation of the platform.

5. An animal trap having the combination with a motor, and a receptacle, of a platform for the animal, a casing surrounding said platform having an opening for the animal to reach said platform, means to set said motor in operation actuated by said platform upon the animal reaching thereto, a door for said opening, means to move said platform toward said tank and to return it to initial position by the operation of said motor, and said means for setting the motor in operation causing said door to close at the commencement of operation of said platform and to open at the termination of operation of the platform.

6. An animal trap having the combination with a motor, and a receptacle, of a platform for animal, means to set said motor in operation upon the animal reaching said platform, means to maintain said motor in operation for an interval, and means to move said platform in a motion of translation toward said tank from a lower position to a position above said tank and to return it to initial position by the operation of said motor.

Signed at the city of New York, in the county of New York and State of New York, this 12th day of January, A. D. 1916.

MIGUEL DE MARIA ARRIOJA.

Witnesses:
  CHAS. W. LA RUE,
  B. ROMAN.

Copies of this patent may be obtained for five cents each, by addressing the "Commissioner of Patents, Washington, D. C."